United States Patent [19]
Pieper

[11] Patent Number: 6,165,099
[45] Date of Patent: Dec. 26, 2000

[54] PLANETARY GEAR

[75] Inventor: Klaus Peter Pieper, Bielefeld, Germany

[73] Assignee: The Torrington Company, Torrington, Conn.

[21] Appl. No.: 09/408,247

[22] Filed: Sep. 29, 1999

[30] Foreign Application Priority Data

Sep. 29, 1998 [DE] Germany ............................ 198 44 658

[51] Int. Cl.[7] .................................................... F16H 1/28
[52] U.S. Cl. ........................................... 475/305; 475/314
[58] Field of Search ................................. 475/312, 314, 475/305

[56] References Cited

U.S. PATENT DOCUMENTS

| | | | |
|---|---|---|---|
| 1,692,546 | 11/1928 | Dolne-Dehan | 475/305 |
| 2,467,627 | 4/1949 | Olson | 475/314 |
| 5,607,369 | 3/1997 | Yang | 475/312 |

*Primary Examiner*—Dirk Wright
*Attorney, Agent, or Firm*—John C. Bigler

[57] ABSTRACT

In a planetary gear, at least one planet wheel (9) is coupled by a freewheel (19) to the planet carrier (7), and the sun wheel (3) is coupled by a freewheel (13) to a center spindle (1) fixed to a casing. By the freewheels (13, 19), it is achieved that the gearing effect is released or non-positively bridged depending on the driving direction. When the direction of rotation is reversed, the freewheels (13, 19) in both directions of rotation block the planetary gear "solid" and thus the power transmission. One application is, e.g., in integrated starter/generator assemblies for internal combustion engines.

14 Claims, 12 Drawing Sheets

PLANETARY GEAR

BACKGROUND OF THE INVENTION

This invention relates generally to planetary gears, and, more particularly, to a planetary gear comprising a sun wheel mounted on a center spindle, at least one planet wheel mounted on a rotatable planet carrier, and an annulus surrounding the wheels, the planet wheel being in drive connection on the one hand to the sun wheel and on the other to the annulus, at least one of these elements being connected to a stationary part.

Such planetary (or epicyclic) gears generally comprise at least three elements rotatable about a common central axis, namely, e.g., a central sun wheel rotatably mounted on a gear casing by means of a spindle, at least one planet wheel rotatably mounted via at least one further spindle on a planet carrier, and a rotatably arranged outer annulus surrounding the sun wheel and planet wheel. Such planetary gears are mostly configured as gear wheel assemblies wherein the planet wheel meshes with both the interior sun wheel and with the outer annulus. In this arrangement the planet wheel, also termed epicyclic wheel, is rotatable not only about its own axis (epicyclic axis) but also about another axis, namely the central axis of the sun wheel. The planet carrier is also termed a web. When this revolves about the central axis, at least one of the three gear wheels may be stationary, namely the sun wheel or annulus, or two or also three of the gear wheels may revolve.

Normally, one of the three elements (sun wheel, planet wheel with planet carrier, annulus) is connected to an input drive and a second of these parts is connected to an output drive. The third part required, to handle the counter-torque, is connected to a stationary frame or casing either fixedly or releasably via a coupling or brake. As a result of this configuration, the gearing effect is constant, providing power transmission, regardless of the driving direction.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a planetary gear comprising a sun wheel mounted on a center spindle, at least one planet wheel mounted on a rotatable planet carrier, and an annulus surrounding said wheels. The planet wheel is in drive connection, on the one hand, to the sun wheel and, on the other, to the annulus. (11). At least one of these three elements is connected to a stationary part wherein a freewheel is provided between the stationary part and said element mounted thereby. The planet wheel is coupled via a further freewheel to the planet carrier.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
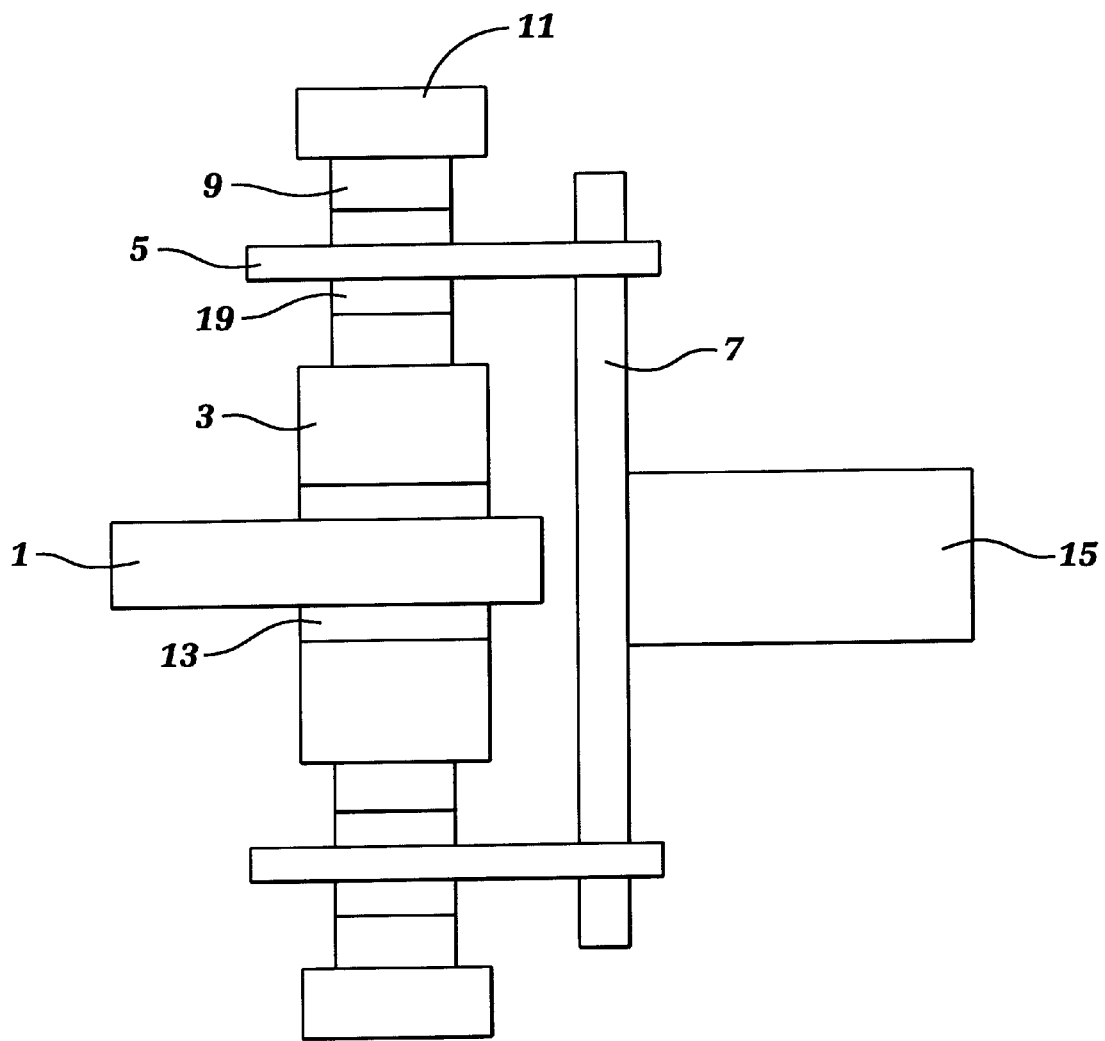
FIG. 1 is a schematic axial sectional view of a planetary gear.

Referring now to FIG. 1, the planetary gear comprises a central axis or spindle 1 fixed relative to a gear casing (not shown). The center spindle 1 is surrounded by a sun wheel 3 revolving about this spindle 1. The sun wheel 3 meshes by means of its outer teeth with at least one epicyclic or planet wheel 9 provided likewise with outer teeth, the planet wheel 9 being mounted via an epicyclic or planet axis 5 rotatable on a web or planet carrier 7 which in turn is mounted by a rotatable spindle 15. The spindle 15 is arranged coaxial to the center spindle 1 but axially separate therefrom. The at least one planet wheel 9 is surrounded by an outer rim gear or annulus 11 with inner teeth. The one or more planet wheels 9 thus mesh during the revolution of the gear with the outer teeth of the sun wheel 3, on the one hand, and with the inner teeth of the annulus 11 on the other.

Figure 2:
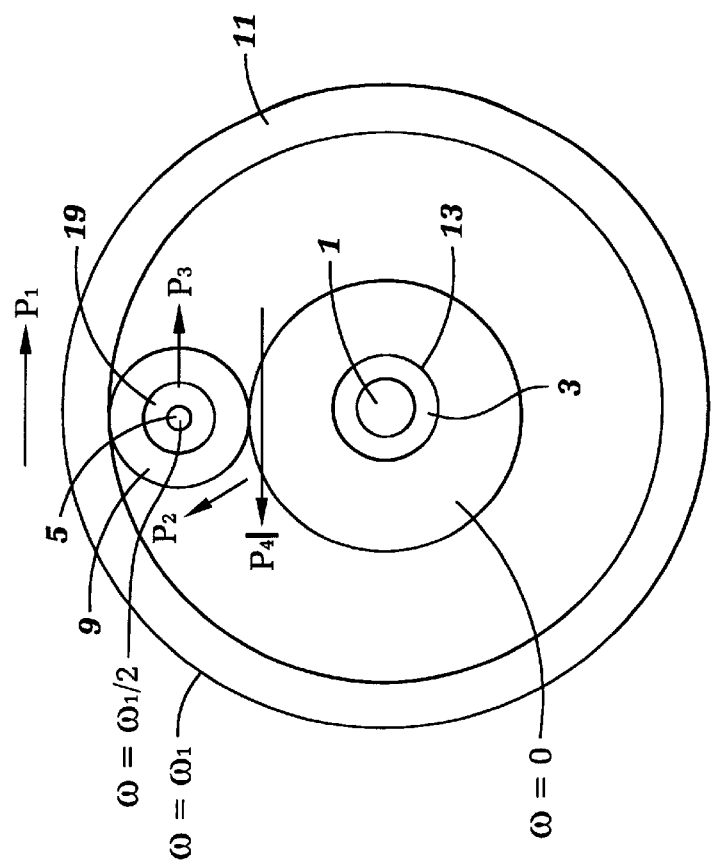
FIG. 2 is, in addition to the schematic axial sectional view shown in FIG. 1, a schematic face view of the planetary gear as viewed from the left, to assist in explaining the relationships in an operating condition.
Figure 2:
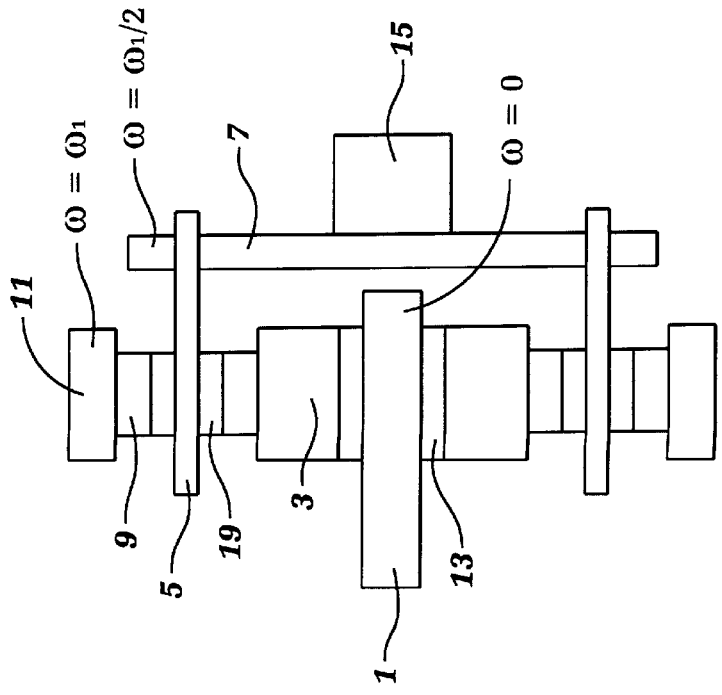

Disposed between the center spindle 1 and the sun wheel 3 is a one-way clutch or freewheel 13 which, e.g., as known, may be formed by means of wedge ramps and clamping bodies. Furthermore, interposed between one of the planet wheels 9 and its planet axis 5 or the planet carrier 7 is a further one-way clutch or freewheel 19. The two freewheels 13 and 19 are arranged so that they each lock in the same direction of rotation of the sun wheel 3 and of the planet wheel 9 and release the revolving of the sun wheel 3 and the planet wheel 9 about their corresponding axes or spindles 1 and 5 in the opposite direction of rotation. Thus, when the planet wheel 9 is freely rotating clockwise, as shown in FIG. 2, the sun wheel 3 meshing therewith will attempt to rotate counter-clockwise, but is prevented from doing so by the freewheel 13.

Normally, in a planetary gear the sun wheel 3 is surrounded by several planet wheels 9. In accordance with the invention, these planet wheels 9 may then each be coupled by means of its own freewheel 19 via the corresponding planet axis 5 to the common planet carrier 7. All of these freewheels 19 of the planet wheels 9 then block in the same direction of rotation corresponding to the blocking direction of the freewheel 13 of the sun wheel 3. This results in a symmetrical arrangement of the planet wheels 9 with the freewheels 19 relative to the central sun wheel 3, thus producing in operation a good mass compensation, whereby force/moment transmission to several planet wheels 9 or freewheels 19 is distributed so that for the same power transmission the diameter of the planet wheels 9 may be configured correspondingly small to thus render the planetary gear compact as a whole.

Should there be a risk, when employing several freewheels 19 on several planet wheels 9, of one of the freewheels blocking first and the other freewheels 19 blocking later or not at all, this could ruin the assurance of providing an even distribution of the drive moments to all of these planet wheels 9. This is why in practice probably only one freewheel 19 will be provided on one of the planet wheels 9. Then, compensating the masses can be solved by other means, e.g., by means of ballasting the planet wheels.

The functioning of the planetary gear will now be discussed.

Referring now to FIG. 2, it is assumed that the rim gear 11 is driven in a direction of rotation clockwise as indicated by the arrow $P_1$. In this arrangement, the freewheel 19 between the planet wheel 9 and its corresponding spindle 5 enables the planet wheel 9 to rotate on the spindle 5, i.e., likewise clockwise in the direction of the arrow $P_2$. As a result, the planet wheel 9 is driven in the direction of the arrow $P_3$. Due to the rotation of the planet wheel 9 in the direction of the arrow $P_2$ the sun wheel 3 would be driven in a direction of rotation contrary to that of the arrow $P_2$ (counterclockwise). In this contrary direction of rotation, however, the freewheel 13 blocks between the sun wheel 3 and the center spindle 1 held fixed relative to the casing (not shown), resulting in the sun wheel 3 being prevented from rotating, which is indicated by the arrow $P_4$ provided with a blocking symbol. As a result, the planet wheel 9 rolls clockwise on the fixed outer circumference of the sun wheel 3 as a result of which the planet carrier 7 rotates via the planet axis 5 with half the rotational speed of the driven rim gear 11 in the sense of the arrow $P_3$. In this case, the torque is derived via the planet carrier 7 and the spindle 15. Due to this gearing effect, the output torque at the planet carrier 7 is doubled at half the rotational speed relative to the input torque at the rim gear 11 (less the gearing losses due to friction). The speed relationships of the individual components of the planetary gear are indicated by the corresponding angular velocities $\omega$ and $\omega_1$.

When the direction of rotation of the drive as shown in FIG. 2 at the rim gear 11 is reversed, i.e., counter-clockwise or contrary to the direction of the arrow $P_1$, the freewheel 19 of the planet wheel 9 meshing therewith blocks so that the planet wheel 9 is unable to rotate contrary to the direction of the arrow $P_2$ on its planet axis 5. In this arrangement, the driving force is transmitted from the planet wheel 9 in the same direction as previously in the direction of the arrow $P_4$ to the sun wheel 3. Since, however, the freewheel 13 of the sun wheel 3 blocks in this driving direction, a non-positive connection materializes between the rim gear 11 and the gear casing connected to the fixed center spindle 1 due to both freewheels 19 and 13 being blocked "solid", as a result of which any movement of the planetary gear is altogether prevented.

In summary therefore, when the rim gear 11 is driven in the direction of the arrow $P_1$ with the angular velocity $\omega_1$ the planet carrier 7 is driven with twice the torque but with half the angular velocity, i.e., $\omega_1/2$ while when the rim gear 11 is driven corresponding to the direction of the arrow $P_1$ the whole gear is blocked "solid" and movement as a whole is prevented.

Figure 3:
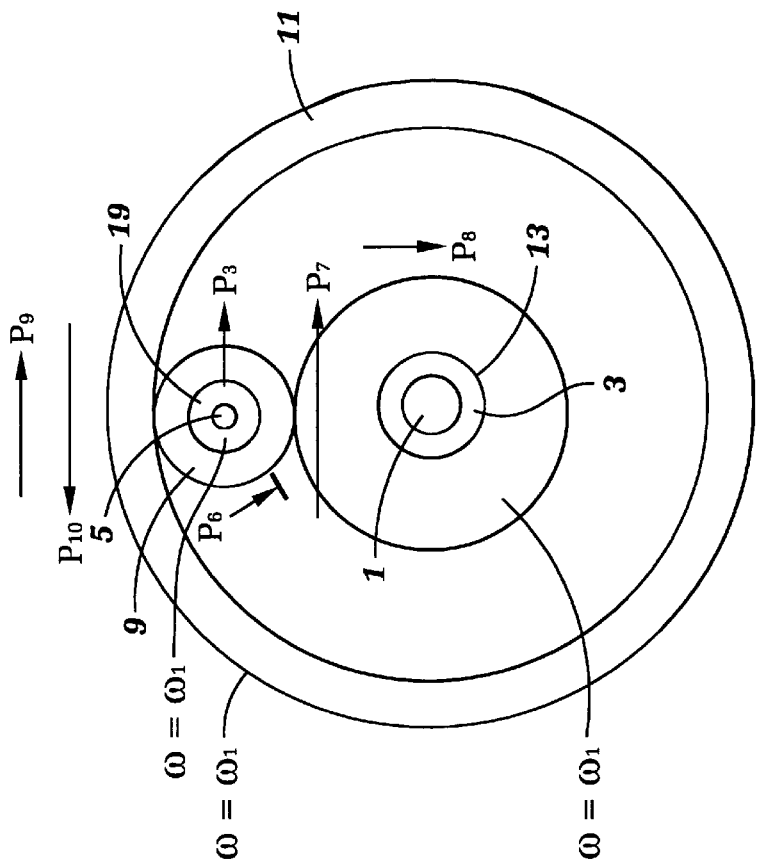
FIG. 3 is a combination of views corresponding to those shown in FIG. 2, to assist in explaining another operating condition.
Figure 3:
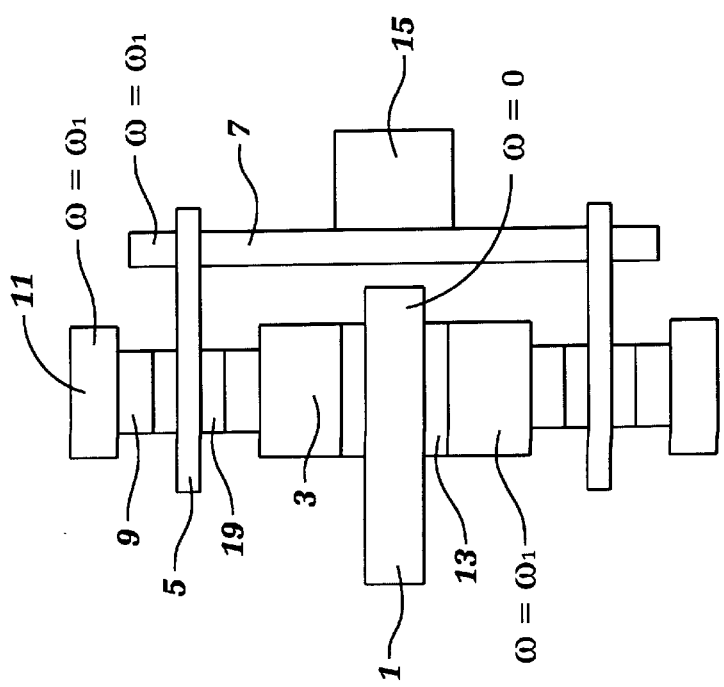

When, as shown in FIG. 3, instead of the rim gear 11 the planet carrier 7 is driven via its spindle 15 in the same direction $P_3$ as in the previous case, i.e. with the angular velocity $\omega_1$, but the rim gear 11 is retarded by a braking moment contrary to the direction of the arrow $P_{10}$, then the planet wheel 9 will attempt to rotate in an arrow direction $P_6$ contrary to the direction of the arrow $P_2$ (FIG. 2) due to it meshing with the rim gear 11. In this direction of rotation, however, the freewheel 19 blocks and produces a non-positive connection between the planet axis 5 or the carrier spindle 15 and the planet wheel 9 (blocking symbol on arrow $P_6$). In this case the sun wheel 3 is slaved clockwise, i.e., in the direction of the arrow $P_7$ by the planet wheel 9. In this direction of rotation, the freewheel 13 between the sun wheel 3 and its spindle 1 fixed relative to the gear casing is released so that the sun wheel 3 freely rotates with the angular velocity $\omega_1$ about the center spindle 1 in the direction of the arrow $P_8$. Since this results in the freewheel 19 of the planet wheel 9 blocking, i.e., the planet wheel 9 being unable to rotate about its axis 5, the planet wheel 9 slaves the rim gear 11 in a rigid connection so that the rim gear 11 rotates clockwise with the same angular velocity $\omega_1$ as the planet carrier 7 in the direction of the arrow $P_9$. This rotation in the direction of the arrow $P_9$ counteracts the braking moment in the direction of the arrow $P_{10}$ by which the drive moment is derived via the rim gear ii. The driving/input torque at the carrier spindle 15 of the planet carrier 7 and the output torque at the rim gear 11 are accordingly equal for the same angular velocity $\omega_1$.

When the direction of rotation of the drive of the planet carrier 7 as shown in FIG. 3 is reversed, i.e., counter-clockwise and contrary to the direction of the arrow $P_3$, and when the rim gear 11 is thereby held fixed by a braking force, the planet wheel 9 will attempt to turn contrary to the direction of the arrow $P_6$ due to it meshing with the rim gear 11 because it is in this direction of rotation that its freewheel 19 is released. Due to the counteracting direction of rotation of the sun wheel 3 meshing with the planet wheel 9, the freewheel 13 between the sun wheel 3 and the center spindle 1 is fixed in the casing blocks so that also a rotation of the planet wheel 9 is prevented, i.e., a non-positive connection materializes between the rim gear 11 and the center spindle 1 which blocks the planetary gear "solid".

If the outer rim gear 11 is not held fixed by a braking moment when the planet carrier 7 is driven in a direction opposite to the direction of the arrow $P_3$ and counter-clockwise, it instead being able to freely rotate, the planet wheel 9 is rotated in the direction of the arrow $P_6$ due to the planet wheel 9 meshing with the rim gear 11 or due to the planet wheel 9 meshing with the sun wheel 3, as a result of which the freewheel 19 is blocked. This results in the sun wheel 3 attempting to move contrary to the direction of the arrow $P_7$ or to rotate contrary to the direction of the arrow $P_8$ which is prevented by the freewheel 13 blocking in this direction of rotation contrary to the direction of the arrow $P_8$. This in turn results in a non-positive connection between the gear casing or the center spindle 1 fixedly connected thereto, on the one hand, and the rim gear 11, on the other, so that also thereby the planetary gear is blocked "solid".

The planetary gear in accordance with the invention may be put to use, for example, in an integrated starter/generator unit of an internal combustion engine. On starting or also when operated as an electric auxiliary motor by means of the generator, the translation of the planetary gear is exploited to boost the torque. In this arrangement the drive occurs from the generator via rim gear 11 to the planet carrier 7 or the carrier-output spindle 15 thereof for driving the internal combustion engine with twice the driving torque corresponding to that, as shown in FIG. 2.

In generator operation, i.e., the generator is to be driven by the internal combustion engine, the driving force—as shown in FIG. 3—is transmitted from the internal combustion engine via the spindle 15 of the planet carrier 7 non-positively with no change in the rotary speed or angular velocity to the rotor of the generator which is connected to the rim gear 11. Due to the non-positive connection with no change in the angular velocity $\omega_1$, overreving of the generator rotor is avoided.

By blocking the entire gear "solid" contrary to the described driving directions in each case the same driving directions are always assured for the two operating conditions and unwanted backslip or back jolts in the drive connection are prevented.

Figure 4:
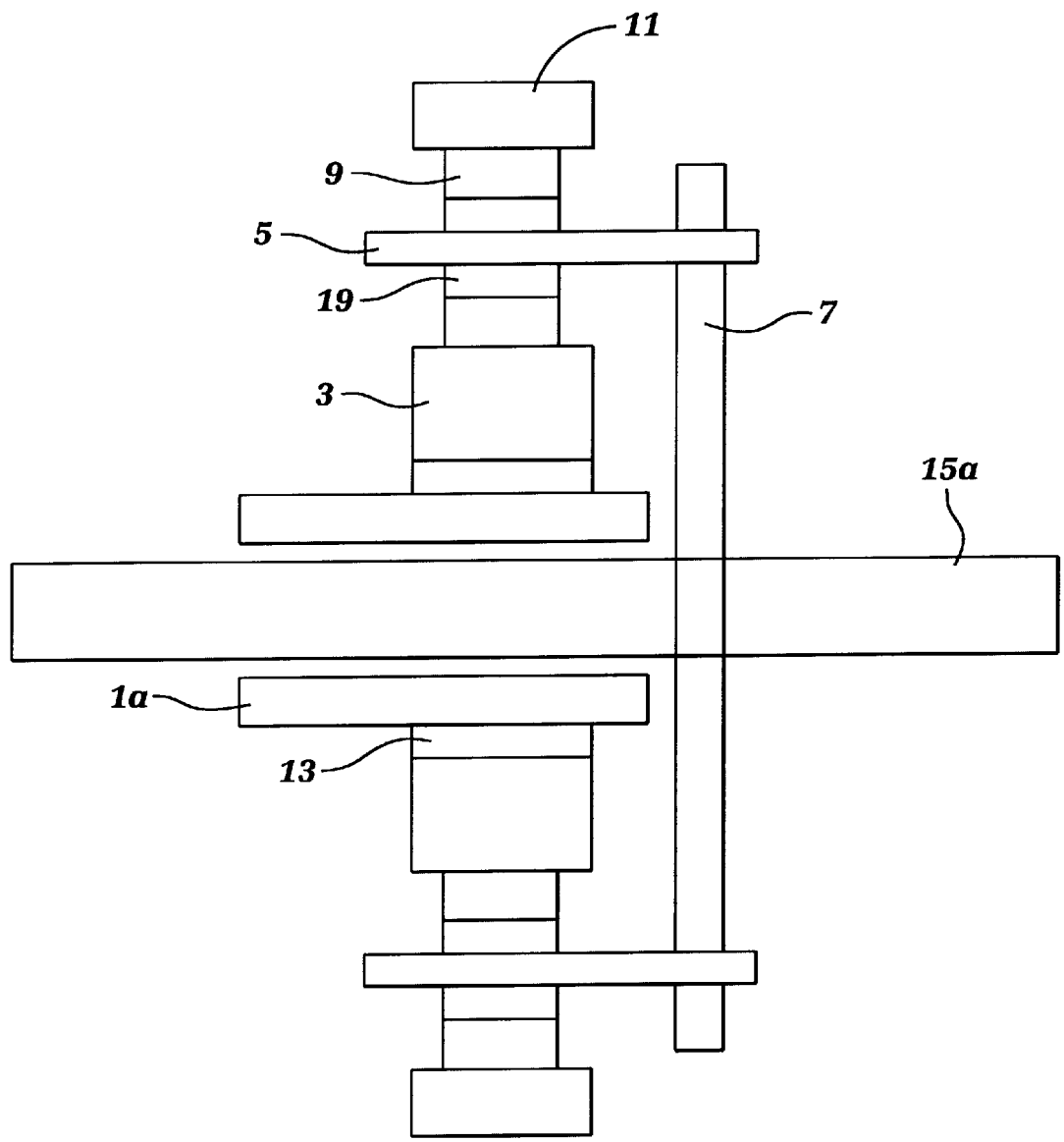
FIG. 4 is a schematic axial sectional view similar to that shown in FIG. 1, illustrating another embodiment.

In the embodiments shown in FIGS. 1 through 3, the casing-fixed center spindle 1 and the rotatable carrier spindle 15 of the planet carrier 7 are located coaxially, in line, and are separated from each other axially. So that the whole planetary gear can also be arranged on a full-length carrier spindle 15a, however, as shown in FIG. 4, in this arrangement the casing-fixed center spindle is configured as a quill spindle 1a. The carrier spindle 15a of the planet carrier 7 is then guided through the quill spindle 1a axially as evident from FIG. 4.

In general, the principle as described is not restricted to toothed planetary gears, it instead functioning also, e.g., in friction wheel gears, i.e., with a pure non-positive moment transmission between the sun wheel 3, the planet wheels 9 and the annulus 11. In such an arrangement, at least one of these transmission members (wheels 3, 9, 11) will be coated with an elastic material to provide the required friction.

Each of the freewheels 13, 19 as described may also assume in addition a bearing function between the components bridged thereby.

In the embodiments as described in the following, parts which are like are identified by like reference numerals as in the embodiments as shown in FIGS. 1 to 4 so that in the following substantially only the differences in the further embodiments as compared to those as shown in FIGS. 1 to 4 are described.

Figure 5:
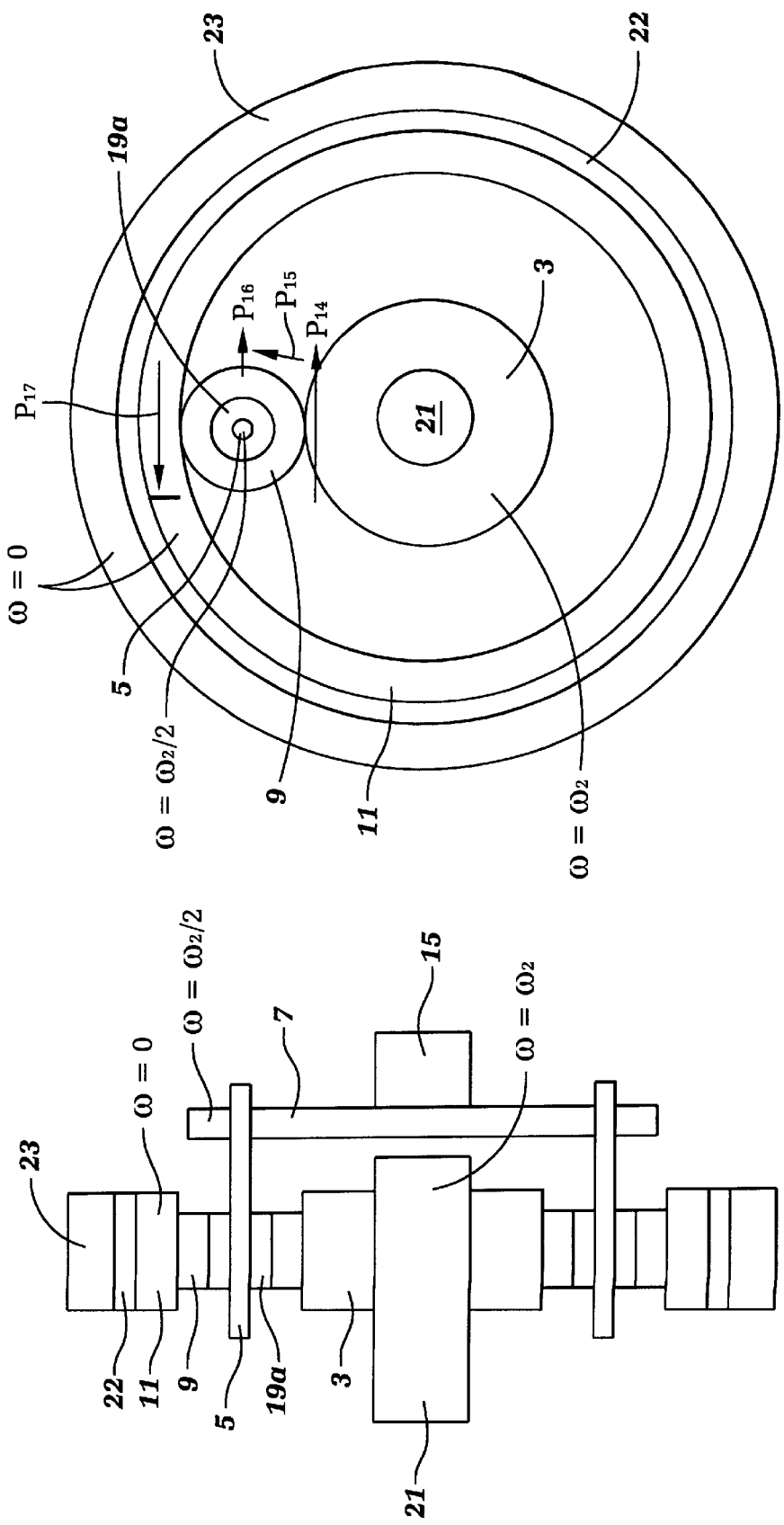
FIGS. 5 and 6 are schematic axial sectional views and schematic face views of a further embodiment, to assist in explaining the relationships in two further operating conditions.
Figure 6:
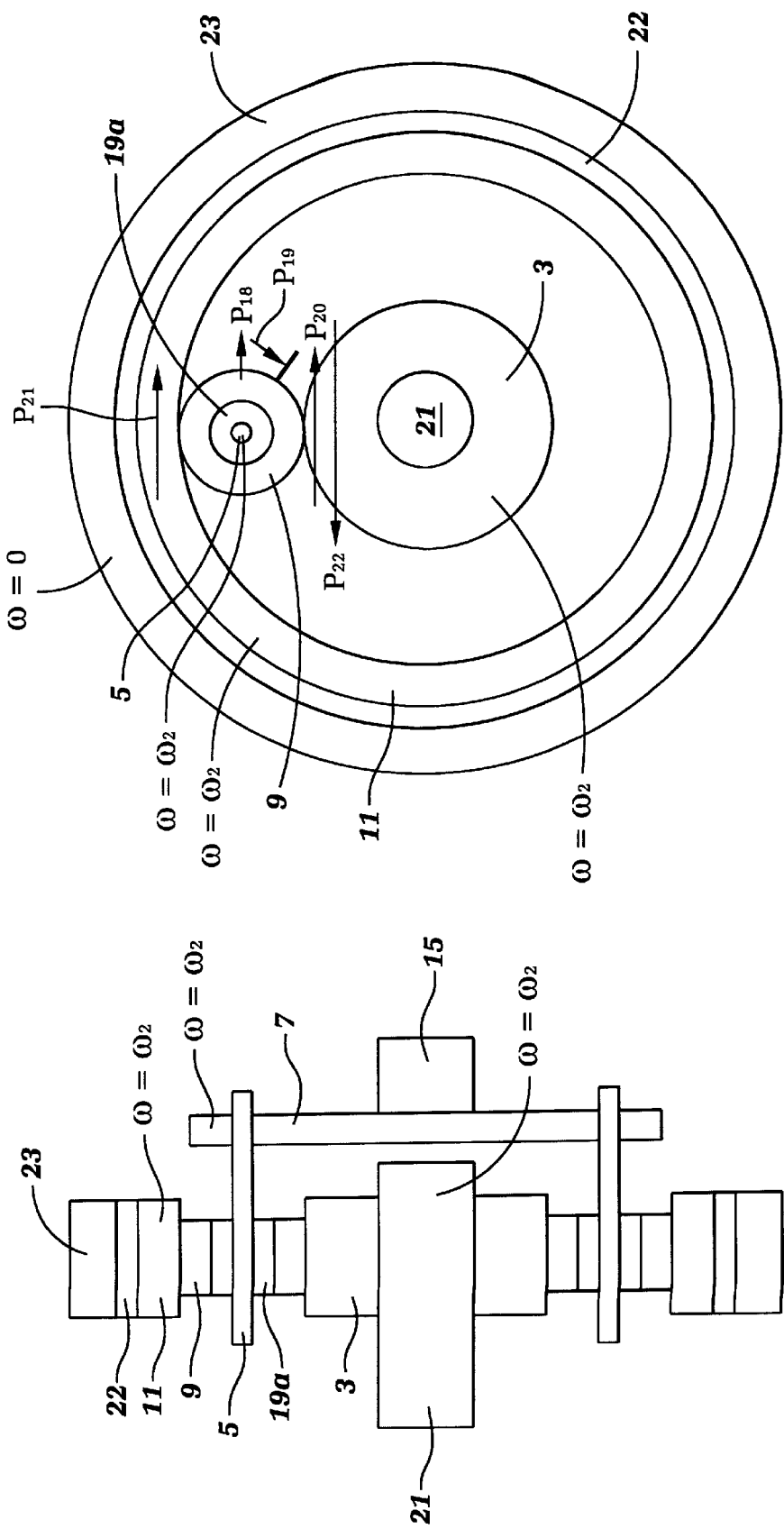

Referring now to FIGS. 5 and 6, there is illustrated an embodiment in which the freewheel 13 between the center spindle 1 and the sun wheel 3 is replaced by a freewheel 22 arranged on the outer side of the annulus 11 between the latter and a gear casing 23, the center spindle 21 carrying the sun wheel 3 directly. Provided between the planet wheel 9 and its carrier spindle 5 in this arrangement is a freewheel 19a.

When the sun wheel 3 is driven in the direction of the arrow $P_{14}$ with the angular velocity $\omega=\omega_2$ the planet wheel 9 is rotated in the direction of the arrow $P_{15}$. The planet carrier 7 wanders at half the angular velocity $\omega_2/2$ in the direction of the arrow $P_{16}$. The freewheel 22 on the annulus 11 blocks so that the latter is unable to rotate in the direction of the arrow $P_{17}$, it instead being blocked solid to the casing 23 ($\omega=0$). When, however, the planet carrier 7 is driven in the direction of the arrow $P_{18}$ (FIG. 6), the freewheel 19a blocks so that no rotation of the planet wheel 9 occurs in the direction of the arrow $P_{19}$. Instead, a rigid connection results with the sun wheel 3 so that the latter revolves with the same angular velocity $\omega=\omega_2$ in the direction of the arrow $P_{20}$ as the planet carrier 7. The annulus 11 revolves in this case likewise with the same angular velocity $\omega_2$ in the direction of the arrow $P_{21}$.

When the direction of rotation is reversed in both drive variants as shown in FIGS. 5 and 6, the whole arrangement blocks again in the same way as described in the connection with FIGS. 1 through 3.

Figure 7:
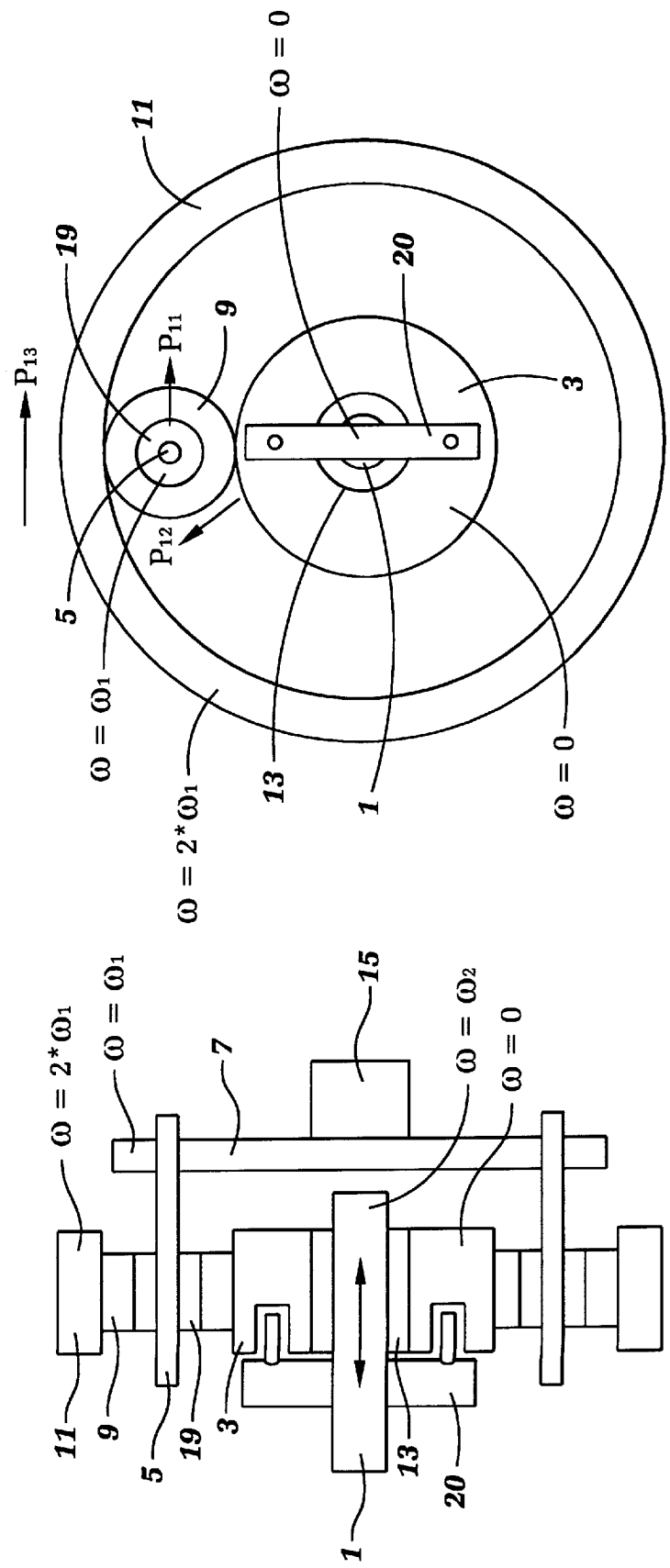
FIG. 7 is a schematic sectional view with a corresponding schematic face view, illustrating yet a further embodiment of a planetary gear.
Figure 8:
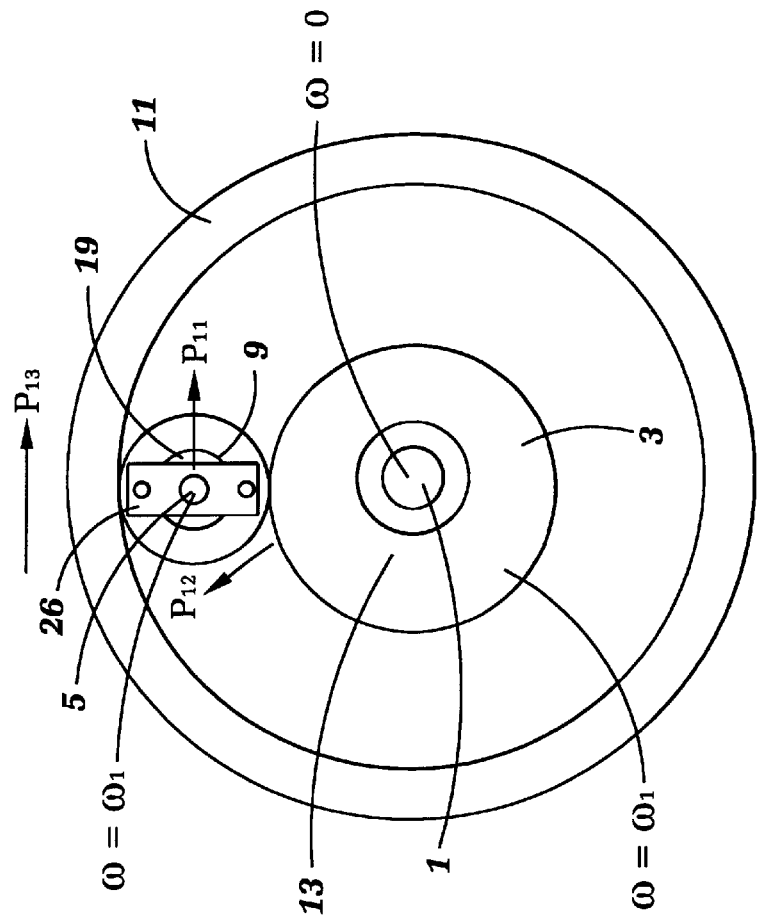
FIG. 8 is a schematic sectional view and a corresponding schematic face view illustrating an embodiment modified relative to that shown in FIG. 7.
Figure 8:
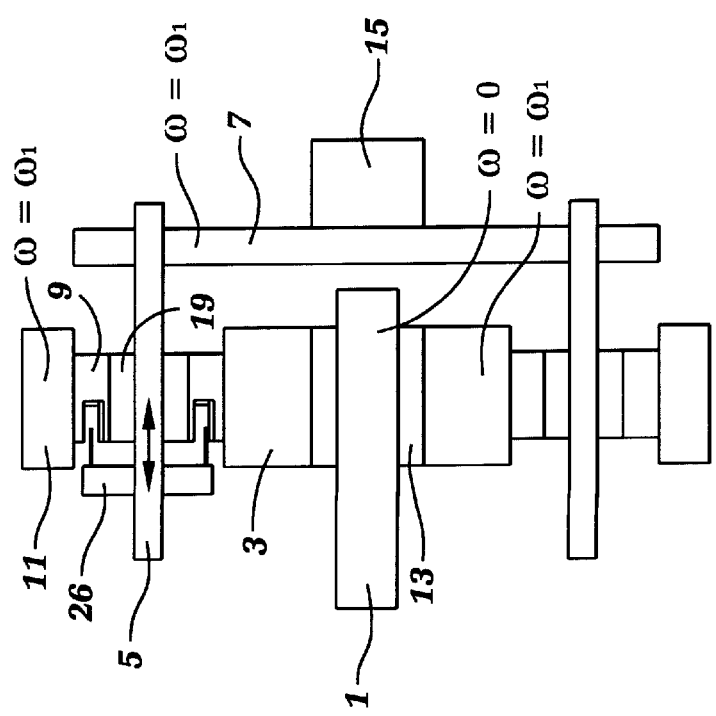

Referring now to FIGS. 7 and 8, the embodiments as illustrated correspond substantially to those as shown in FIGS. 1 through 3, except that a brake 20 in FIG. 7 or 26 in FIG. 8 is provided in addition. The brake 20 as shown in FIG. 7 acts between the center spindle 1 and the sun wheel 3. When the planet carrier 7 is driven at the angular velocity $\omega_1$ in the direction of the arrow $P_{11}$, the planet wheel 9 rotating in the direction of the arrow $P_{12}$ (FIG. 7) and the brake is effective, the sun wheel 3 in this case serves as a support for the planet wheel 9. This results in a further speed stage with $2 \times \omega_1$ in the direction of the arrow $P_{13}$ for the annulus 11.

When, however, as shown in FIG. 8 the brake 26 blocks rotation of the planet wheel 9 relative to the planet carrier 7, a rigid connection materializes in turn between the annulus 11 and the sun wheel 3 which makes a further speed stage possible at the sun wheel 3 and at the planet carrier 7 with $\omega=\omega_1$ when the annulus 11 is driven with $\omega=\omega_1$ (arrow $P_{13}$).

Referring now to FIGS. 9 through 12 there is illustrated an embodiment in which, as in the example shown in FIGS. 5 and 6, the sun wheel 3 is directly secured to a center spindle 21. Instead of a freewheel 13 between the sun wheel 3 and its spindle or instead of a freewheel 22 between the annulus 11 and its casing 23, here a further freewheel 24 is disposed between the carrier spindle 15 of the planet carrier 7 and a gear casing 25 in addition to the freewheel 19b, thus making translation possible as a function of the direction of rotation.

Figure 9:
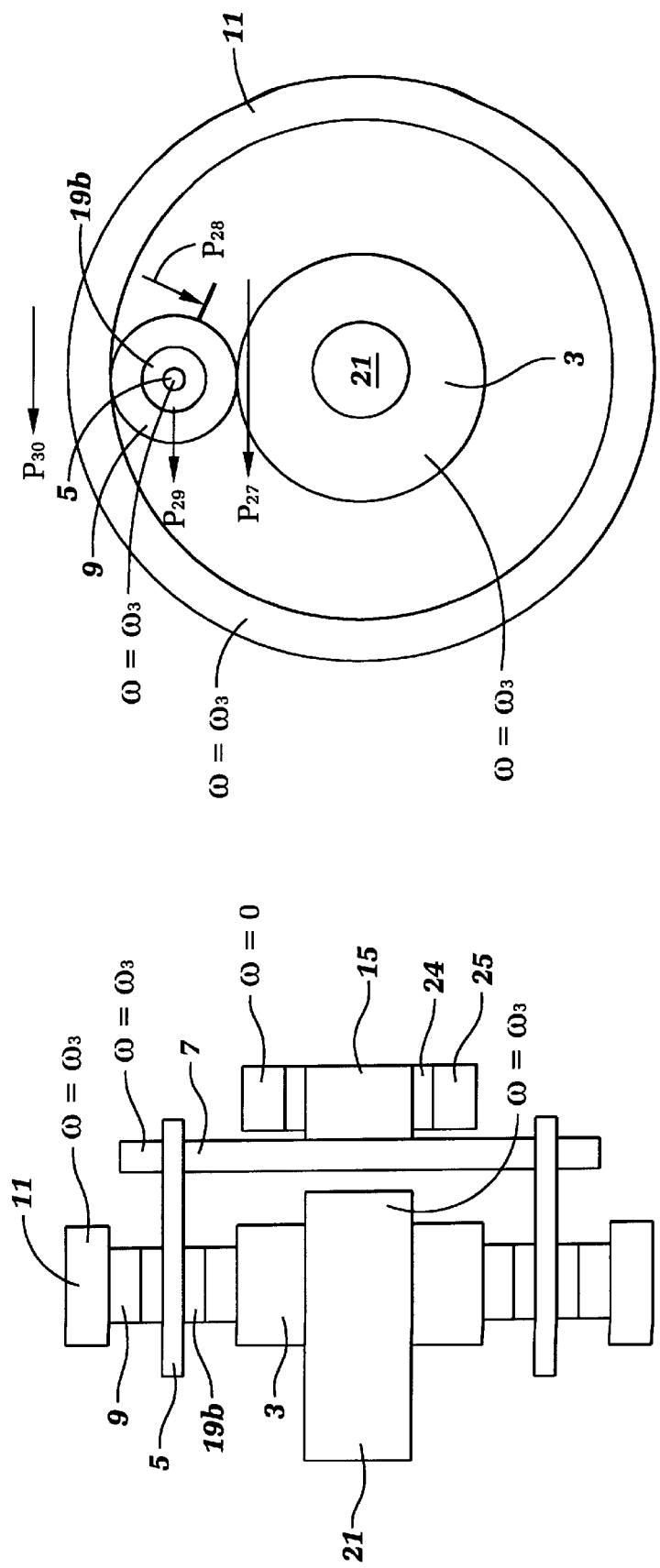
FIGS. 9 through 12 are schematic sectional views and schematic face views of still another embodiment of a planetary gear, to assist in explaining the relationships in various operating conditions of this planetary gear.
Figure 10:
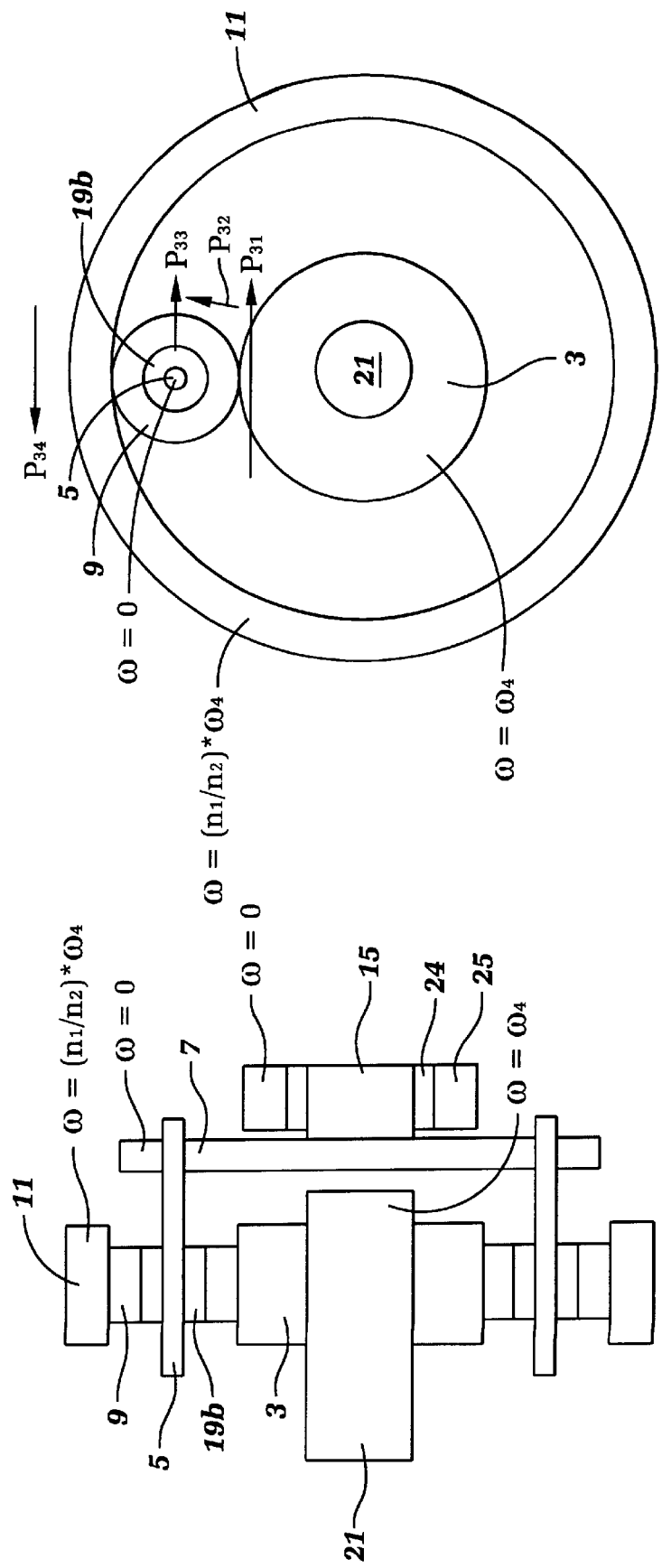

As shown in FIG. 9, the sun wheel 3 is driven from the center spindle 21 with the angular velocity $\omega_3$ counterclockwise in the direction of the arrow $P_{27}$. Due to the freewheel 19b at the planet wheel 9, the latter is unable to rotate on its carrier spindle 5 in the direction of the arrow $P_{28}$. Via the carrier spindle 5, the planet carrier 7 is slaved in the direction of the arrow $P_{29}$. This rotation of $n_1/n_2$ the planet carrier 7 relative to the gear casing 25 is made possible by the freewheel 24, the annulus 11 being slaved in the direction of the arrow $P_{30}$ at the same angular velocity $\omega_3$ which is transmitted from the drive spindle 21 also to the planet carrier 7.

When the direction of rotation (FIG. 10) of the center spindle 21 is reversed in the direction of the arrow $P_{31}$, the planet wheel 9 is able to rotate on its carrier spindle 5 in the direction of the arrow $P_{32}$. However, the planet carrier 7 is blocked by the freewheel 24 relative to the casing 25, i.e., no movement of the planet carrier 7 in the direction of the arrow $P_{32}$ being possible ($\omega=0$). Due to rotation of the planet wheel 9, the annulus 11 is driven in the direction of the arrow $P_{34}$, i.e., with an angular velocity resulting from the translation ratio. When the angular velocity of the central drive spindle 21 equals $\omega_4$ the annulus 11 revolves on a translation ratio $n_1/n_2$ with an angular velocity $\omega=(n_1/n_2) \times \omega_4$ in the direction of the arrow $P_{34}$.

Figure 11:
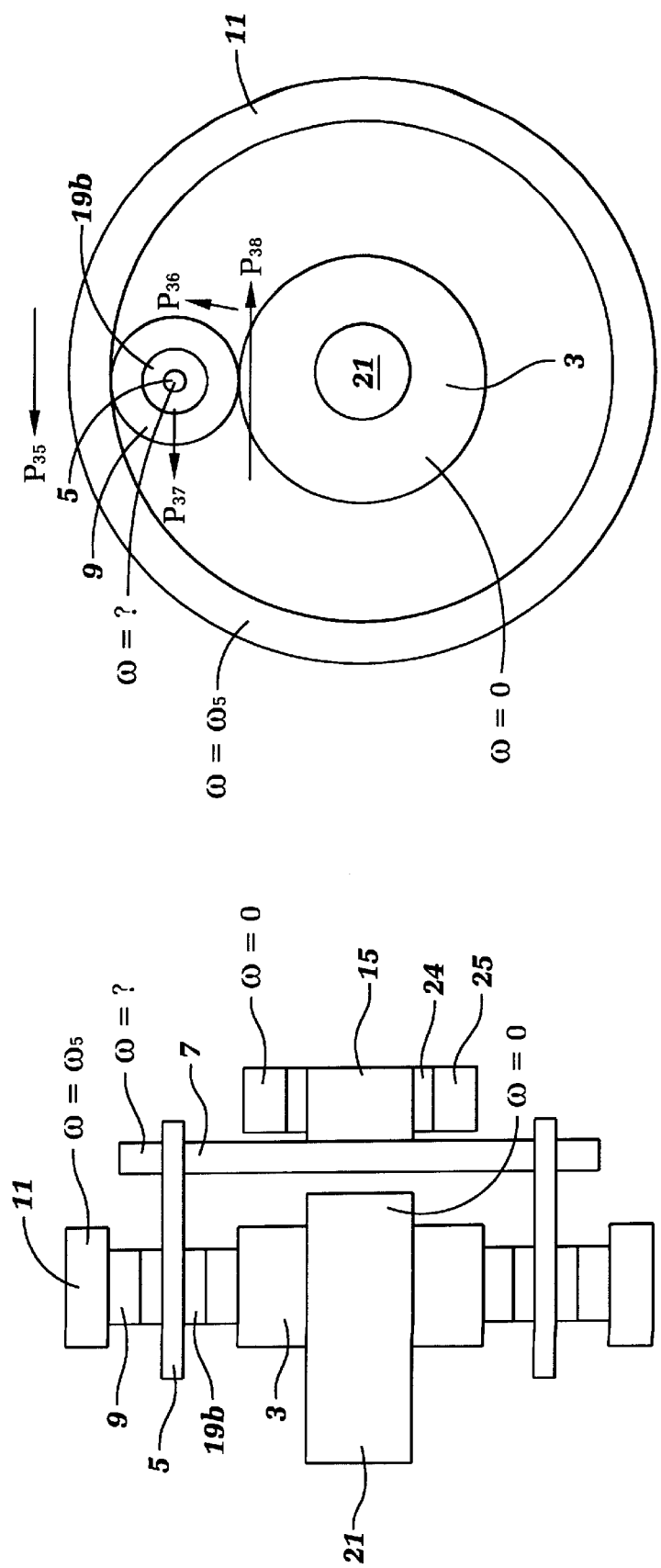

When, as shown in FIG. 11, the annulus 11 is driven counter-clockwise at the velocity $\omega_5$ in the direction of the arrow $P_{35}$, both the planet wheel 9 due to its freewheel 19b in the direction of the arrow $P_{36}$ and the planet carrier 7 due to its freewheel 24 freely revolve, the planet carrier 7 moving in the direction of the arrow $P_{37}$. When the annulus 11 is driven at the angular velocity $\omega_5$, the resulting peripheral velocity of the two elements, planet wheel 9 and planet carrier 7, in the direction of the arrow $P_{37}$ is dictated by the friction existing in the gear. Thus, no moment transmission occurs in the direction of the arrow $P_{38}$ to the sun wheel 3, so that the center spindle 21 is stationary ($\omega=0$).

Figure 12:
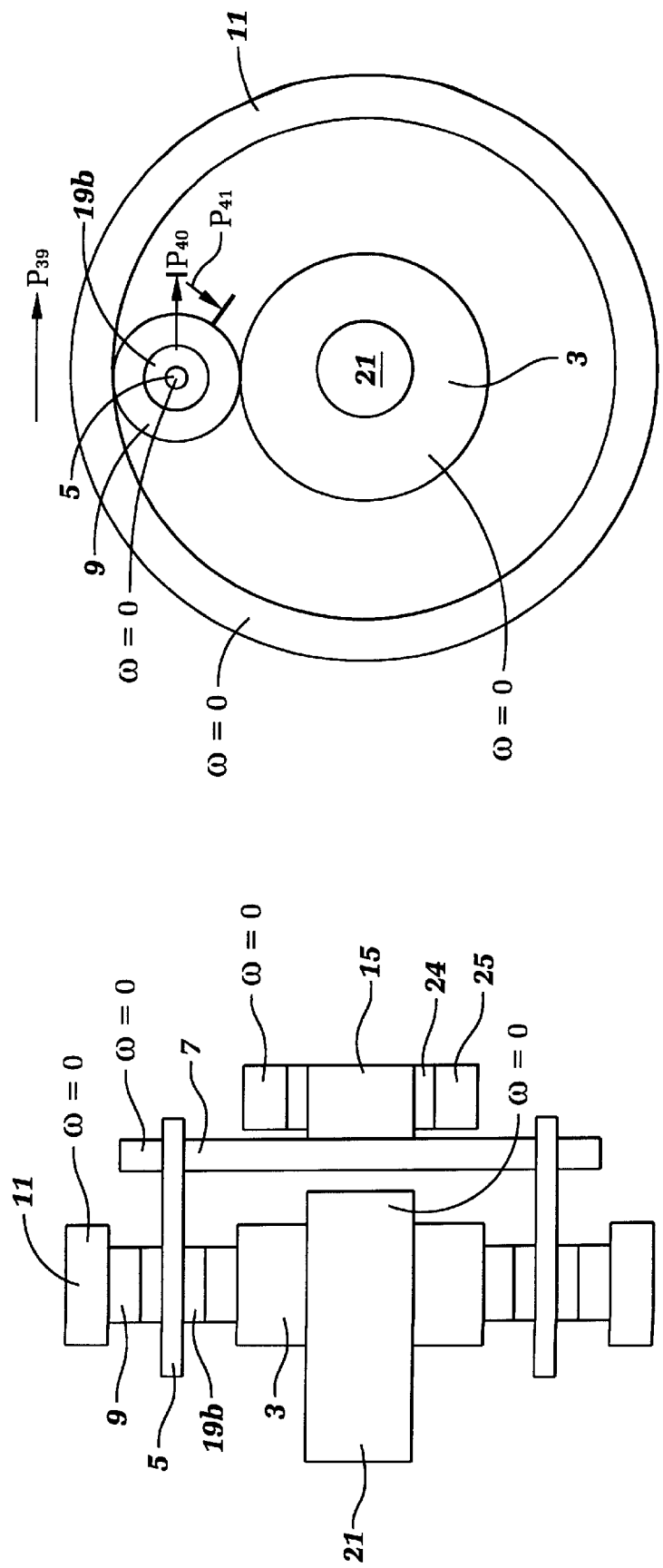

When, however, as shown in FIG. 12, the annulus 11 is required to be driven clockwise in the direction of the arrow $P_{39}$, both the freewheel 19b of the planet wheel 9 and the freewheel 24 of the planet carrier 7 block. A movement of the planet carrier 7 in the direction of the arrow $P_{40}$ and a rotation of the planet wheel 9 in the direction of the arrow $P_{41}$ are prevented ($\omega=0$). The drive moment is absorbed by the casing 25. Thus, there results no drive of the sun wheel 3 so that the center spindle 21 is in turn stationary ($\omega=0$). Due to the gear being blocked, the angular velocity at the annulus 11 is also $\omega=0$.

Accordingly, in the embodiment shown in FIGS. 9 through 12, there is either a translation of the drive moment from the corresponding driven member to the output member (FIGS. 9 and 10) depending on the direction of rotation, or in the reverse driving direction (FIGS. 11 and 12) the planetary gear blocks in both directions of rotation of the drive.

The invention provides a planetary gear that has a gearing effect that is released or non-positively bridged depending on the drive side, i.e., depending on which of the elements is driven. In accordance with the invention, this is achieved by providing a freewheel between the stationary part and the element mounted thereby, and at least one planet wheel is coupled via a further freewheel to the planet carrier.

By arranging freewheels in accordance with the invention, on the one hand between the planet wheel and its carrier spindle and, on the other hand, between the sun wheel and its center spindle or a gear casing, or between the annulus and a gear casing, or between the carrier spindle of the planet wheel and a gear casing, the planetary gear acts in one of its driving directions as an epicyclic gear, and, when the direction of rotation is reversed in these driving directions, the gear acts in each case as a freewheel blocking power transmission.

It will readily be appreciated that a wealth of possible applications exists in various engineering fields for all embodiments as described.

Having described the invention, what is claimed is:

1. A planetary gear comprising:

a sun wheel (3) mounted on a center spindle (1,21);

at least one planet wheel (9) mounted on a rotatable planet carrier (7); and an annulus (11) surrounding said wheels (3,9);

the planet wheel (9) being in drive connection, on the one hand, to the sun wheel (3) and, on the other, to the annulus (11), and at least one of these elements (3,9,11) being connected to a stationary part (1,23,25) wherein a freewheel (13,22,24) is provided between the stationary part (1,23,25) and said element (3,9,11) mounted thereby and the at least one planet wheel (9) is coupled via a further freewheel (19,19a,19b) to the planet carrier (7).

2. The planetary gear as set forth in claim 1, wherein the two freewheels (13,22,24) and (19,19a,19b) are arranged on their rotatable parts (3,11,7) so that they block in the same directions of rotation of said rotatable parts (3,11,7) and of the planet wheel (9).

3. The planetary gear as set forth in claim 1, wherein the planet carrier (7) is rotatable by means of a carrier spindle (15) arranged coaxially to the spindle (1,21) of the sun wheel (3).

4. The planetary gear as set forth in claim 3, wherein the spindle (15) of the planet carrier (7) and the spindle (1,21) of the sun wheel (3) are located axially in line.

5. The planetary gear as set forth in claim 3, wherein the spindle (1,21) of the sun wheel (3) is configured as a quill spindle (1a) and the spindle (15) of the planet carrier (7) is guided through the quill spindle (1a).

6. The planetary gear as set forth in claim 1, wherein the sun wheel (3) is surrounded by several planet wheels (9) each coupled by means of a freewheel (19,19a,19b) to the planet carrier (7), and all of said freewheels (19,19a,19b) block in the same direction of rotation corresponding to the blocking direction of said further freewheel (13,22,24).

7. The planetary gear as set forth in claim 1, wherein the sun wheel (3) and the planet wheel (9) are configured as gear wheels with outer teeth and the annulus (11) is configured as a gear wheel with inner teeth.

8. The planetary gear as set forth in claim 1, wherein said wheels (3,9,11) are configured as friction wheels.

9. The planetary gear as set forth in claim 8, wherein at least one of said wheels (3,9,11) is coated with an elastic material.

10. The planetary gear as set forth in claim 1, wherein the spindle (1,1a) of the sun wheel (3) is fixed relative to a casing, the planet wheel (9) is mounted via a spindle (5) to the rotatable planet carrier (7), these components being surrounded by an outer rotatable annulus (11) and said one freewheel (13) is provided between said spindle (1,1a) and said sun wheel (3), either the planet carrier (7) or the annulus (11) being drivable (FIGS. 1 through 4).

11. The planetary gear as set forth in claim 1, wherein when employing a freewheel (22) between the annulus (11) and its stationary part (casing 23) either the sun wheel (3) is drivable via its spindle (21) or the planet carrier (7) is drivable via its spindle (15), respectively (FIGS. 5 and 6).

12. The planetary gear as set forth in claim 1, wherein when employing a freewheel (24) between the spindle (15) of the planet carrier (7) and its stationary part (casing 25) either the sun wheel (3) is drivable via its spindle (21) or the annulus (11) is drivable from the outside, respectively (FIGS. 9 through 12).

13. The planetary gear as set forth in claim 1, wherein a brake (20,26) is provided between the center spindle (1) and the sun wheel (3) and/or opposite to the planet wheel (9) (FIGS. 7 and 8).

14. The planetary gear as set forth in claim 1, in combination with a starter/generator assembly of an internal combustion engine, the internal combustion engine being connected to the planet carrier (7) and the starter/generator assembly to the outer annulus (11).

* * * * *